US012364370B2

(12) United States Patent
Low et al.

(10) Patent No.: US 12,364,370 B2
(45) Date of Patent: *Jul. 22, 2025

(54) SYSTEMS AND METHODS FOR STORING AND DISPENSING DETERGENTS

(71) Applicant: FEN GLOBAL LTD, Whangarei (NZ)

(72) Inventors: Regan Low, Whangarei (NZ); Carly Jean Low, Whangarei (NZ)

(73) Assignee: FEN GLOBAL LTD, Whangarei (NZ)

(*) Notice: Subject to any disclaimer, the term of this patent is extended or adjusted under 35 U.S.C. 154(b) by 0 days.

This patent is subject to a terminal disclaimer.

(21) Appl. No.: 18/226,134

(22) Filed: Jul. 25, 2023

(65) Prior Publication Data

US 2023/0363591 A1 Nov. 16, 2023

Related U.S. Application Data

(63) Continuation of application No. 17/565,285, filed on Dec. 29, 2021, now Pat. No. 11,737,611.

(51) Int. Cl.

| | |
|---|---|
| ***A47K 5/14*** | (2006.01) |
| ***A47K 5/12*** | (2006.01) |
| ***B01F 21/20*** | (2022.01) |
| *B01F 101/24* | (2022.01) |

(52) U.S. Cl.

CPC .............. *A47K 5/14* (2013.01); *A47K 5/1201* (2013.01); *B01F 21/22* (2022.01); *B01F 2101/24* (2022.01)

(58) Field of Classification Search

CPC .......... A47K 5/14; A47K 5/1201; A47K 5/03; B01F 21/22; B01F 2101/24

See application file for complete search history.

(56) References Cited

U.S. PATENT DOCUMENTS

| | | | | |
|---|---|---|---|---|
| 428,144 A | | 5/1890 | Russell | |
| 755,700 A | * | 3/1904 | Robinson | F16M 11/10 248/127 |
| 855,428 A | | 5/1907 | Bishop | |
| 1,579,869 A | | 4/1926 | Klages | |
| 2,481,243 A | * | 9/1949 | Robinson | A47K 5/02 312/351 |
| 3,681,806 A | * | 8/1972 | Han | A47K 5/03 312/351 |

(Continued)

FOREIGN PATENT DOCUMENTS

| | | | |
|---|---|---|---|
| AU | 2019100588 | | 7/2019 |
| CN | 207125681 U | * | 3/2018 |

(Continued)

OTHER PUBLICATIONS

Low et al., "A Detergent Dispenser," New Zealand Provisional Patent Application No. 770111, filed Nov. 19, 2020, 20 pages.

(Continued)

*Primary Examiner* — Bob Zadeh

(74) *Attorney, Agent, or Firm* — Sheridan Ross P.C.

(57) ABSTRACT

Embodiments of the present disclosure provide a detergent dispenser device and methods of systems related thereto. Dispensers of the present disclosure comprise a container with side walls, a base, and a lid. The dispensers and methods of use described herein are operable to store and contain a cleaning agent, allow fluid to be applied to the agent to create a cleaning solution, and further facilitate drying and fluid management.

12 Claims, 8 Drawing Sheets

(56) References Cited

U.S. PATENT DOCUMENTS

| | | | | | |
|---|---|---|---|---|---|
| 4,606,893 | A | | 8/1986 | Sangster | |
| 4,808,236 | A | | 2/1989 | Davis, Jr. | |
| 4,948,078 | A | * | 8/1990 | Dumenigo | A47K 5/1201 248/176.1 |
| 5,086,952 | A | | 2/1992 | Kryk | |
| 5,941,376 | A | | 8/1999 | Liggett | |
| 6,152,294 | A | * | 11/2000 | Weinberg | A47K 5/03 206/77.1 |
| 7,677,386 | B1 | * | 3/2010 | Kumar | A47K 5/03 206/77.1 |
| 11,737,611 | B2 | * | 8/2023 | Low | A47K 5/14 222/1 |
| 2010/0239476 | A1 | * | 9/2010 | King | B01F 21/22 422/261 |
| 2013/0043360 | A1 | * | 2/2013 | Pixley | A47K 5/02 248/231.91 |
| 2013/0101478 | A1 | | 4/2013 | Johnson et al. | |
| 2013/0318871 | A1 | * | 12/2013 | Street | A01G 9/021 47/65.5 |
| 2015/0257611 | A1 | * | 9/2015 | Huang | B65D 25/108 206/77.1 |
| 2018/0132511 | A1 | | 5/2018 | Heringlehner et al. | |
| 2019/0142226 | A1 | * | 5/2019 | Teague | B65D 5/4279 206/77.1 |
| 2020/0221908 | A1 | | 7/2020 | O'Brien | |
| 2023/0363591 | A1 | * | 11/2023 | Low | A47K 5/1201 |

FOREIGN PATENT DOCUMENTS

| | | | | | |
|---|---|---|---|---|---|
| CN | 209058991 | | | 7/2019 | |
| CN | 209058991 | U | * | 7/2019 | |
| CN | 211511580 | U | * | 9/2020 | |
| DE | 202023104006 | U1 | * | 8/2023 | |
| FR | 3088320 | | | 5/2020 | |
| GB | 244149 | | | 12/1925 | |
| GB | 2060373 | A | * | 5/1981 | A47K 5/03 |
| JP | H06-076474 | | | 10/1994 | |
| JP | H10117961 | A | * | 5/1998 | |
| JP | 2002-327480 | | | 11/2002 | |
| KR | 20130045574 | A | * | 5/2013 | |
| NZ | D49884 | | | 10/1945 | |
| WO | WO 00/27729 | | | 5/2000 | |
| WO | WO 00/41608 | | | 7/2000 | |
| WO | WO 2011/017753 | | | 2/2011 | |
| WO | WO-2014019823 | A1 | * | 2/2014 | A47K 5/03 |

OTHER PUBLICATIONS

Low et al., "A Detergent Dispenser," New Zealand Patent Application No. 783811, submitted Dec. 22, 2021, 28 pages.

Official Action for New Zealand Patent Application No. 783811, dated Aug. 14, 2023, 5 pages.

Official Action for U.S. Appl. No. 17/565,285, dated Oct. 26, 2022, 12 pages.

Notice of Allowance for U.S. Appl. No. 17/565,285, dated Apr. 14, 2023, 10 pages.

* cited by examiner

SYSTEMS AND METHODS FOR STORING AND DISPENSING DETERGENTS

This Continuation Application claims priority to U.S. Non-Provisional patent application Ser. No. 17/565,285, filed on Dec. 29, 2021, which claims the benefit of priority from New Zealand Provisional Patent Application No. 770111, filed Nov. 19, 2020, the entire disclosures of which are hereby incorporated by reference.

FIELD

Embodiments of the present disclosure relate to detergent and soap dispensers and methods for use thereof. In various embodiments, detergent dispensers for use with a solid detergent bar, and methods for dispensing detergent using dispensers and a kit containing a dispenser and a detergent bar for use with the dispenser are provided.

BACKGROUND

Traditional dish soap bars (referred to as dish soap) and detergent bars are two very different products. Dish soaps have been known for many years and there has been a resurgence in the use of dish soaps with traditional soap shakers for washing dishes, as consumers move away from plastic dispensing bottles in favour of more sustainable eco-friendly products. An example of a traditional soap shaker can be seen in U.S. Pat. No. 428,144A. to Russell, which is hereby incorporated by reference in its entirety.

Dish soap used in the known soap shakers are made from oils and lye, are ineffective in hard water, leave residue on the dishes, are not very effective with greasy dishes, and are used up very quickly.

Comparatively, a dish detergent bar is primarily formed from solid surfactants or mixture of surfactants with cleaning properties, similar to those in dish liquid, but omitting water to produce a solid bar. Detergents are free rinsing and work effectively in hard water, as they are relatively unreactive to the minerals in hard water. A dish detergent bar works in much the same way as liquid dish detergent, but is provided in a concentrated form, making one bar of solid detergent similar to two or more bottles of dish wash liquid.

Compared to a traditional dish soap bar providing 20-30 washes per bar, a concentrated detergent bar will provide 70-80 washes and provides superior cleaning attributes compared to a soap bar of the same size.

Given the different properties of a detergent bar compared to traditional dish soap, the use of a solid detergent bar in a standard soap shaker provides sub-standard results, as the mesh over-aggravates the detergent bar, resulting in an oversupply of detergent to the water. This in turn results in excess suds and a premature dissolving of the detergent bar, making the bar uneconomical to use. The dish soap is much harder and solid in texture than the detergent bar, so the abrasive nature of the soap shaker is designed to pull enough soap from the solid bar to wash the dishes. Because the detergent bar is a much softer product, the traditional soap shaker is much too abrasive.

In addition, traditional soap shakers have a wide open mesh and are primarily designed to be shaken or swished around in a bowl or sink of water, providing no means to control the flow of water over the dish soap bar, and the swishing further aggravates the dish soap bar, releasing additional soap into the water. Similarly, due to the open structure of the soap shaker, running the soap shaker directly under that tap also results in a large volume of water running directly over the soap bar.

While these shakers are effective for dispensing of an oil and lye based dish soap, they would be ineffective in effectively dispensing detergent from a concentrated detergent bar and result in premature disintegration of the detergent bar due to aggregation, excess water flow and wear and tear.

SUMMARY

There exists a long-felt, unmet and growing need to provide sustainable systems, devices and methods for storing and using cleaning supplies that do not rely on plastics.

It is an object of the present disclosure to provide a dispenser for a solid detergent bar. It is also an object of the present disclosure to provide a method for effectively dispensing detergent from a solid detergent bar. It is also an object of the present disclosure to provide a kit including a solid detergent bar and a dispenser for the solid detergent bar.

In one embodiment, a detergent dispenser is provided that comprises a container for receiving a solid detergent bar. The container comprises side walls, a base, and a lid. The lid is adapted to be provided to the container side walls at an opposing end of the side walls from the container base. The lid comprises a lid top and one or more lid side walls and the lid top comprises one or more apertures extending through the lid top and the container base comprises one or more apertures extending through the container base. When the lid is positioned on the container, a fluid is able to flow through a flow path running through the lid top, through the container and out the base of the container. In preferred embodiments, the lid top comprises a grate.

In some embodiments, the lid top includes a first face and an opposing second face, wherein the first face comprises one or more fins extending upwardly from the first face of the lid top. It is contemplated that the first face includes a plurality of fins parallel to each other, and the fins extend upwardly substantially perpendicular to the first face of the lid top. The lid is contemplated as comprising one or more apertures located in between the fins.

In certain embodiments, the fins are curved or partially curved. Alternatively, the lid top comprises a central elongate aperture and more preferably a plurality of additional elongate apertures surrounding the central elongate aperture. The one or more apertures are contemplated as being tapered through the lid top. Preferably, apertures cover between 20-80% of the lid top, more preferably between approximately 30-60%.

In various embodiments, a lid top is provided that comprises a first face and an opposing second face. In preferred embodiments, the lid comprises side walls that extend upwardly from the first face around the circumference of the lid top.

More preferably, the lid side walls extend at an angle between 80-100° from the first face of the lid top. Even more preferably, the lid side walls extend from the first face between 5 mm-30 mm.

Alternatively, the lid side walls have an inverted U or J shaped cross section, such that the side walls extend from the first face of the lid top in a first direction, then curve 160-180° and extend back to the lid top (U shape) or past the second face of the lid top (J shape) in a second direction, the side walls creating a recess for receiving the container side walls.

The lid side walls are contemplated as comprising an internal surface and an external surface and preferably, the internal and/or external surface of the lid side walls includes one or more rims, recesses or flanges, the rims, recesses and/or flanges adapted to releasably connect to the container side walls.

In various embodiments of the present disclosure, it is contemplated that lids of the present disclosure comprise selectively removable features that can be removed to insert or remove a detergent (for example). It should be noted, however, that the present disclosure is not limited to such embodiments. Alternative embodiments contemplate, for example, that additional or alternative points of ingress and egress for detergent are provided. A bottom or sidewall portion of the device may comprise a cap, aperture, gate, hinged member, or other to provided access to an internal volume of various containers as shown and described herein.

In some embodiments, the second face of the lid top includes one or more rims, recesses or flanges, the rims, recesses and/or flanges adapted to releasably connect to the container side walls.

The container side walls are contemplated as comprising an internal surface and an external surface and preferably, the internal surface of the container side walls is substantially smooth.

In alternative embodiments, the internal surface of the container walls comprises a flange or shelf to support contents including, for example, a detergent bar.

Preferably, the external surface of the container side walls includes one or more rims, recesses and/or flanges, the rims, recesses or flanges adapted to resiliently and/or releasably connect to the lid.

The container may be any shape that is capable of receiving a solid detergent bar, but is preferably selected from a cube, cuboid, polygon, irregular polygon, cylindrical, spherical, spheroid, with or without rounded corners and edges, or organic shapes derived therefrom.

The cross-sectional shape of the container may be of various shapes and forms. Cross-sectional shapes for the container include but are not limited to square, rectangle, oval, circle, hexagonal, octagonal, triangle, rhombus, each shape with or without rounded corners and edges, or organic shapes derived therefrom.

More preferably, the container is a cuboid or tapered cuboid with rounded corners and/or edges. In some embodiments, the container side walls include one or more apertures to let liquid through.

Preferably, a lower portion or base of the container comprises a plurality of elongate apertures, more preferably, the base includes four parallel elongate apertures. More preferably, the four elongate apertures extend the width of the container base in one direction. And even more preferably, the elongate apertures extend into a portion of the container side walls.

Preferably, the dispenser further includes a tray, the tray including a tray bottom having a first face and an opposing second face, the tray bottom circumferentially surrounded by tray side walls and shaped to receive the base of the container on the first face of the tray bottom.

More preferably, the first face of the tray bottom includes ridges, depressions, undulations or raised features to allow and encourage air flow into the container including, for example, when the container is placed on the tray.

More preferably, the ridges or raised features on the first face of the tray bottom are positioned to correspond to the apertures in the container base, such that when the container base is placed on the tray, the ridges or raised features are received or partially received within the apertures in the container base.

Even more preferably, the tray bottom includes four elongate ridges, such that when the container base includes four elongate apertures, the elongate ridges of the tray surface are received within the elongate apertures of the container base.

Preferably, the tray side walls extend around the circumference of the tray bottom in an upward direction substantially perpendicular to the first face of the tray.

According to a further embodiment of the invention, there is provided a method for dispensing detergent from a solid detergent bar, the method comprising inserting a solid detergent bar in the container of the dispenser, placing a lid onto the container, and placing the dispenser under running water, such that the water flows through the apertures in the dispenser lid, over, around or through a solid detergent block (or similar element) held within the container and out the apertures in the container base. The water (or other liquid) dissolves at least portion of the detergent bar, resulting in a solution or mixture of water and detergent exiting the apertures in the container base. The method is contemplated as further comprising using the resulting solution or mixture as a cleaning agent in one or more cleaning or washing operations.

Methods of the present disclosure contemplate a further step of placing the container on the tray as described above after use to facilitate drying of the detergent bar and draining of fluid or water from the container after use.

According to various embodiments of the present disclosure, kits for dispensing detergent from a solid detergent bar are provided. In one embodiment, a kit is provided that comprises a detergent dispenser comprising: a container for receiving a solid detergent bar, the container having side walls and a base; and a lid, the lid adapted to be provided to the container side walls at an opposing end of the side walls from the container base. The lid includes a lid top and one or more lid side walls, the lid top including one or more apertures extending through the lid top and the base including one or more apertures extending through the base, such that when the lid is positioned on the container, a fluid is able to flow through a flow path running through the lid top, through the container and out the base of the container. A solid detergent bar is contemplated as being provided within the container and the solid detergent bar comprises one or more surfactants and a preservative.

Preferably, the solid detergent bar comprises surfactants selected from lauryl glucoside, decyl glucoside, coco glucoside, sodium cocoyl isethionate, sodium lauryl sulfoacetate, sodium lauryl sulfate, sodium C14-16 alpha olefin sulfonate, sodium coco sulphate, capryl glucoside, sodium cocoamphoacetate and/or cocamidopropyl betaine and other suitable surfactants.

More preferably, the solid detergent bar comprises sodium cocoyl isethionate, lauryl glucoside, decyl glucoside, Geogard 221, citric acid and one or more essential oils.

Preferably, the solid detergent bar is shaped to fit the container of the dispenser.

Further aspects of the invention, which should be considered in all its novel aspects, will become apparent to those skilled in the art upon reading of the following description which provides at least one example of a practical application of the invention.

The above-described embodiments, objectives, and configurations are neither complete nor exhaustive. As will be appreciated, other embodiments of the invention are possible using, alone or in combination, one or more of the features set forth above or described in detail below.

The phrases "at least one," "one or more," and "and/or," as used herein, are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B, and C together.

The term "a" or "an" entity, as used herein, refers to one or more of that entity. As such, the terms "a" (or "an"), "one or more," and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C. § 112(f). Accordingly, a claim incorporating the term "means" shall cover all structures, materials, or acts set forth herein, and all of the equivalents thereof. Further, the structures, materials, or acts and the equivalents thereof shall include all those described in the summary of the invention, brief description of the drawings, detailed description, abstract, and claims themselves.

BRIEF DESCRIPTION OF THE DRAWINGS

The accompanying drawings, which are incorporated in and constitute a part of the specification, illustrate embodiments of the invention and together with the Summary given above and the Detailed Description of the drawings given below, serve to explain the principles of these embodiments. In certain instances, details that are not necessary for an understanding of the invention or that render other details difficult to perceive may have been omitted. It should be understood, of course, that the invention is not necessarily limited to the particular embodiments illustrated herein. Additionally, it should be understood that the drawings are not necessarily to scale.

DETAILED DESCRIPTION

Figure 1:
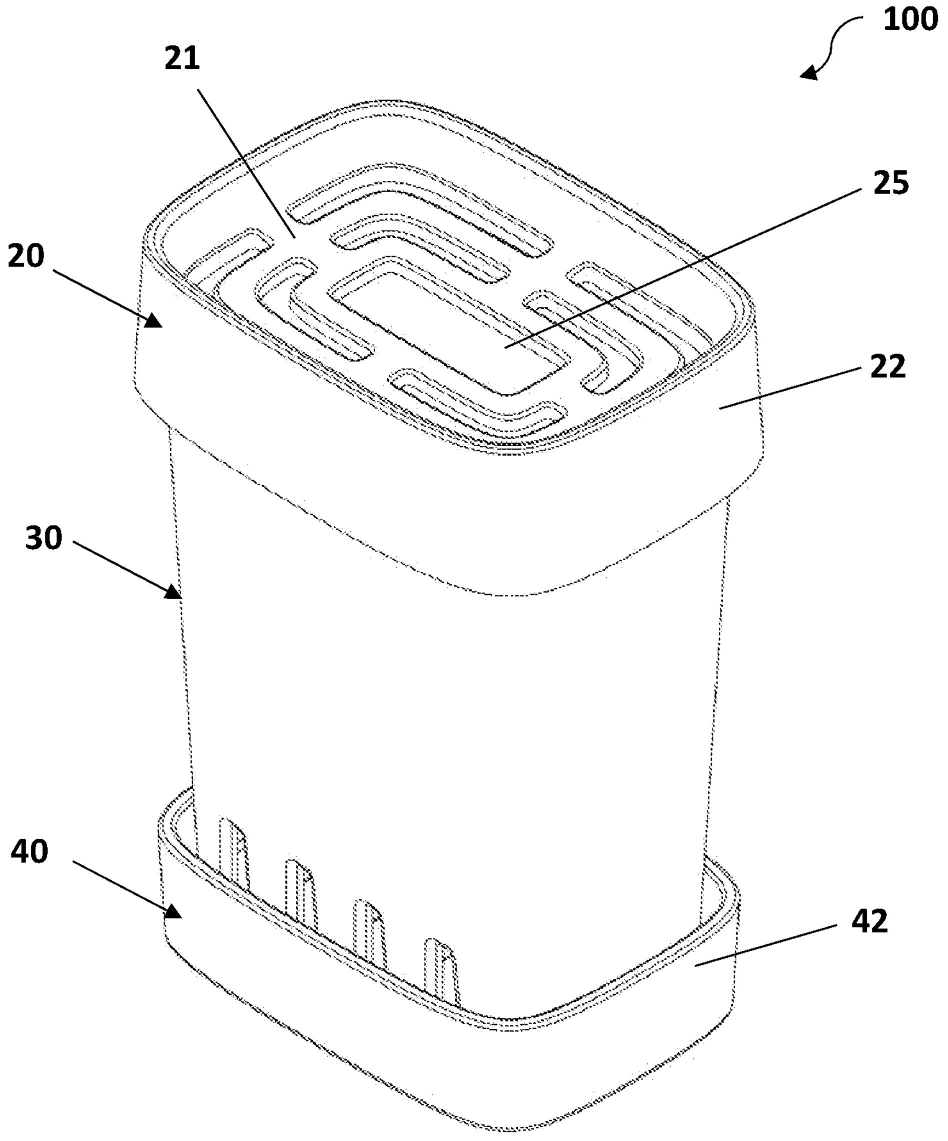
FIG. 1 is a perspective view of a dispenser according to an embodiment of the present disclosure.

Embodiments of the present disclosure have significant benefits across a broad spectrum of endeavors. It is the Applicant's intent that this specification be accorded a breadth in keeping with the scope and spirit of the invention being disclosed despite what might appear to be limiting language imposed by the requirements of referring to the specific examples disclosed. To acquaint persons skilled in the pertinent arts most closely related to the present invention, a preferred embodiment that illustrates the best mode now contemplated for putting the invention into practice is described herein by, and with reference to, the annexed drawings that form a part of the specification. The exemplary embodiment is described in detail without attempting to describe all of the various forms and modifications in which the invention might be embodied. As such, the embodiments described herein are illustrative, and as will become apparent to those skilled in the arts, may be modified in numerous ways within the scope and spirit of the invention.

The detergent dispensers, methods and kits according to the various embodiments described herein allow for the dispensing of soap, solvents, and/or detergents from a solid detergent bar or similar material or bulk form into water or solvent(s). To effectively dispense detergent from a solid bar or similar initial form without oversupplying the detergent or unnecessarily wasting the detergent through aggravation, dispensing apparatus, kits, and methods of using the same are provided in the various embodiments of this disclosure.

As used herein, the term "detergent" generally refers to a surfactant or mixture of surfactants with cleansing properties that are to be provided in dilute solution(s). The term "detergent" at least as provided herewith is intended to apply to various cleaning agents that are operable to, adapted to, and/or intended to interact with a fluid (including but not limited to liquid water) and form a resulting cleaning solution. The term "detergent" at least as provided herein intended to include but not be limited to materials and agents intended for use in specific applications as well as general applications (e.g. generic bar soaps).

Devices of the present disclosure comprise a container with a lid, and a tray for resting the container in. In use, a detergent (e.g. a solid detergent bar) is placed inside the container and is secured with a lid. A flow of fluid (e.g. hot running water) can be applied to the lid until the required amount of water and detergent has been dispensed from the base of the container. The container can then be placed in the tray to drain the container and allow the unused detergent to dry when not in use.

In certain embodiments, at least one of the lid and the container base comprise apertures to allow fluid to flow through the lid when desired. The fluid preferably flows into the container, over, around and/or through the detergent bar and out the base. Once a desired amount of detergent or mixture has been dispensed from the solid bar by the water running over the bar and exiting the container, the container may then be placed on the draining tray to dry the container contents prior to a next use.

Figure 2:
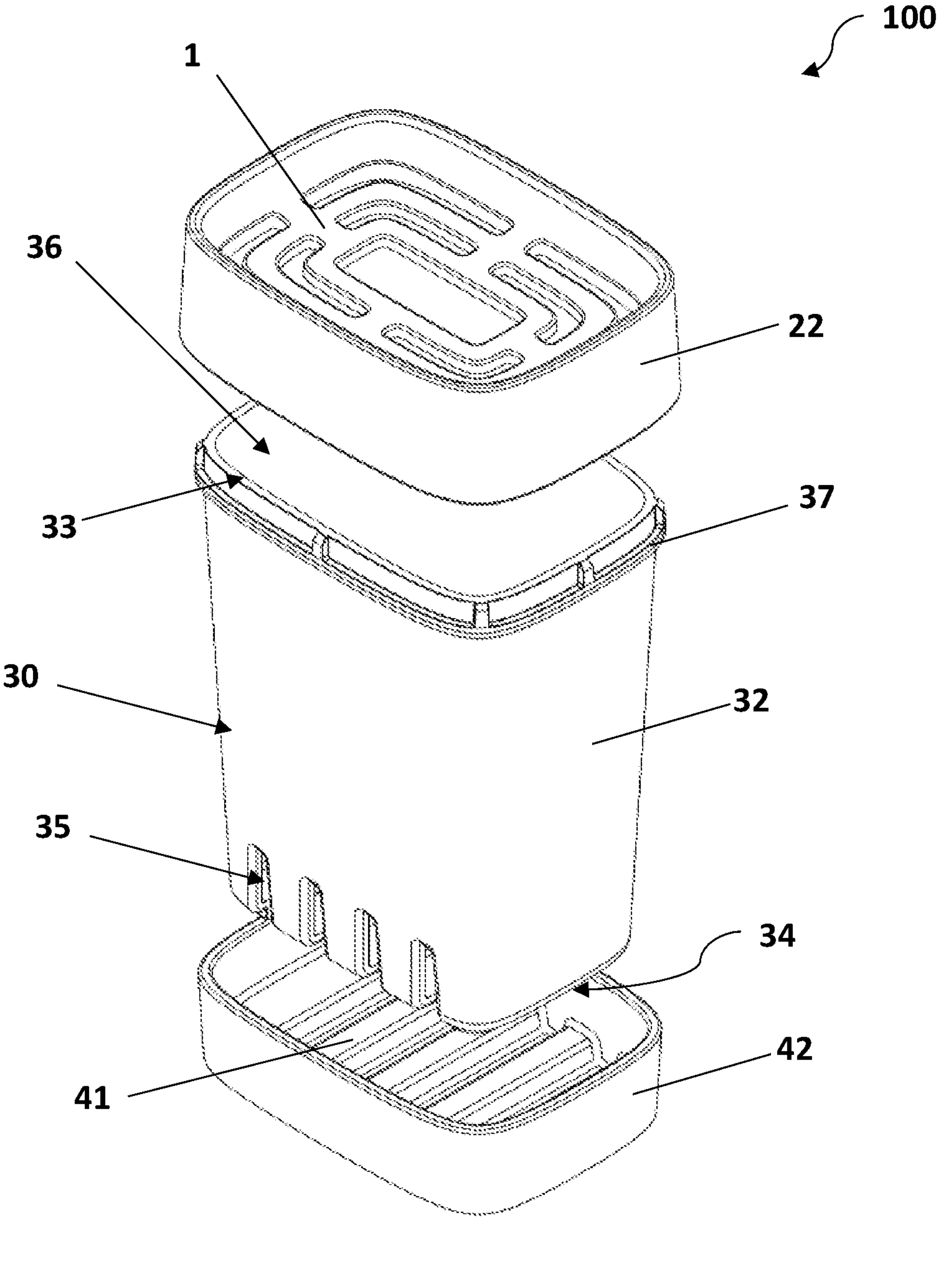
FIG. 2 is an exploded perspective view of the dispenser according to the embodiment of FIG. 1.

FIGS. 1-2 are perspective views of a dispenser 100 according to an embodiment of the present disclosure. As shown, the dispenser 100 comprises a lid 20, a container 30 and a tray 40. The dispenser 100 is preferably provided as a free-standing dispenser that houses a detergent bar (not shown in FIGS. 1-2 but see 50 of FIG. 7) within the container 30 both during use and when not in use. The container 30 is preferably cuboid in shape, and is formed from walls 32 that may have external rounded edges as shown, straight edges or any other design or shape elements on the external surface to increase aesthetic appeal.

The container is contemplated as comprising any shape that is capable of receiving a solid detergent bar or other detergent material, and is preferably selected from a cube, cuboid, polygon, irregular polygon, cylindrical, spherical, spheroid, with or without rounded corners and edges, or organic shapes derived therefrom.

The cross-sectional shape of the of the container is preferably selected from square, rectangle, oval, circle, hexagonal, octagonal, triangle, rhombus, each shape with or without rounded corners and edges, or organic shapes derived therefrom.

Preferably, the container is sized such that the flow path created through the lid, through the container and out the base of the container without the need to hold the dispenser under running water for an extended period of time. In this respect, the container lends itself to more elongate rather than a wider, flatter shape container. A container with a more elongate shape has further advantages of being able to be easily held in the hand while placing the dispenser under running water and providing a more directed flow path that reduces splash and allows water to exit the dispenser in a smaller region. One preferred container shape is shown in the Figures, which is a cuboid or tapered cuboid with rounded corners and/or edges. The rounded edges provide a container that is comfortably held in the hand and is typically sized to be easily held single-handedly by a range of standard adult sized hands.

The internal wall surfaces of the container 30 are preferably smooth, thus reducing agitation between a detergent bar and internal walls when the detergent bar (or similar) is placed within the container. In the dispenser 100 shown in the preferred embodiments, internal walls are substantially flat and smooth. In alternative embodiments, the internal walls comprise features or curves integrally formed within the walls.

Internal walls of the container 30 are contemplated as comprising a flange or shelf (not shown) to aid in supporting the detergent bar above base 34 of container 30. In use, as the detergent bar is used up, it naturally sits within base 34 of container 30, and may become wedged within the base 34 as it becomes smaller. The inclusion of a shelf, flange, rim, sieve or similar feature to hold the detergent bar above the base 34 is contemplated as providing improved fluid flow through the container, as well as increased air flow for drying the detergent bar between uses. In further embodiments, a removable shelf apparatus is provided to support the detergent bar within the container (not shown).

As shown in FIG. 2, the container 30 comprises an open first end 36 defined by rim 33 and an opposing base 34 at a second end of the walls 32, with the base 34 including one or more apertures 35 to allow water entering the container to flow through the open first end 36 and out of the container 30 through aperture(s) 35 under the force of gravity.

Figure 8:
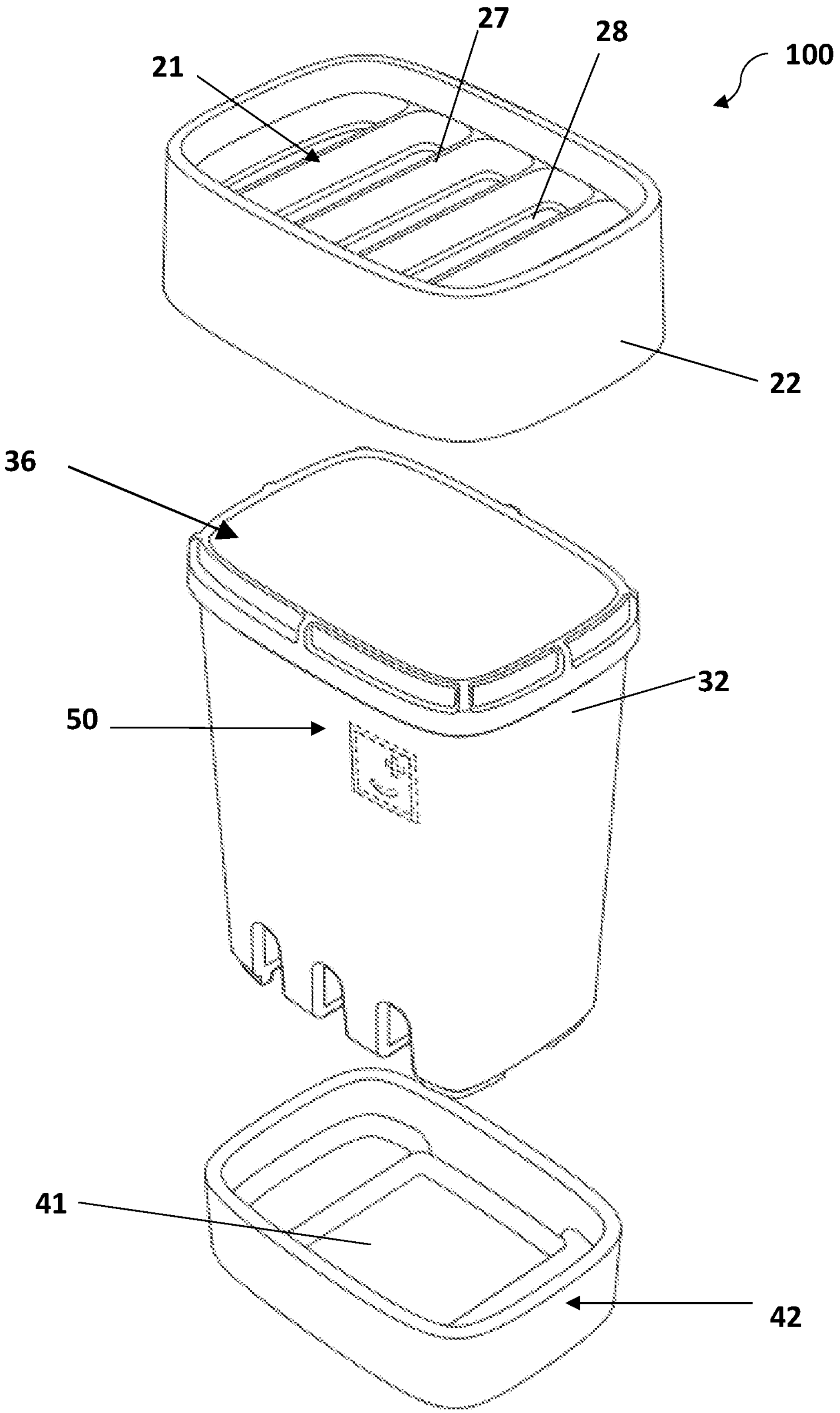
FIG. 8 is an exploded perspective view of the embodiment of FIG. 7.

In the embodiments shown, the apertures 35 preferably comprise four parallel elongate apertures running the width of base 34 and partially up side walls 32. Extending the apertures 35 up into side walls 32 increases air flow in contain 30 when the dispenser is not in use, allowing the detergent bar 50 to dry more quickly inside the container. It will be recognized, however, that embodiments of the present disclosure are not limited to the number, type, or arrangement of apertures in a lower end of the container as shown in FIG. 2. Alternative arrangements are contemplated that achieve the same or substantially the same result. For example, a plurality of circular apertures is contemplated as being provided in the lower end of the container. The apertures 35 may comprise any size or shape, for example rectangular or elongate channels, circular, pyramidal or any organically shaped aperture, but are preferably sized to allow water to readily flow through the container without backing up and submerging detergent bar 50 in water as it waits to drain through aperture 35, while still providing a solid base for detergent bar 50 to rest on. FIG. 8 shows a side cross sectional view of the container 30 where apertures 35 can be seen in the container base.

Figure 9:
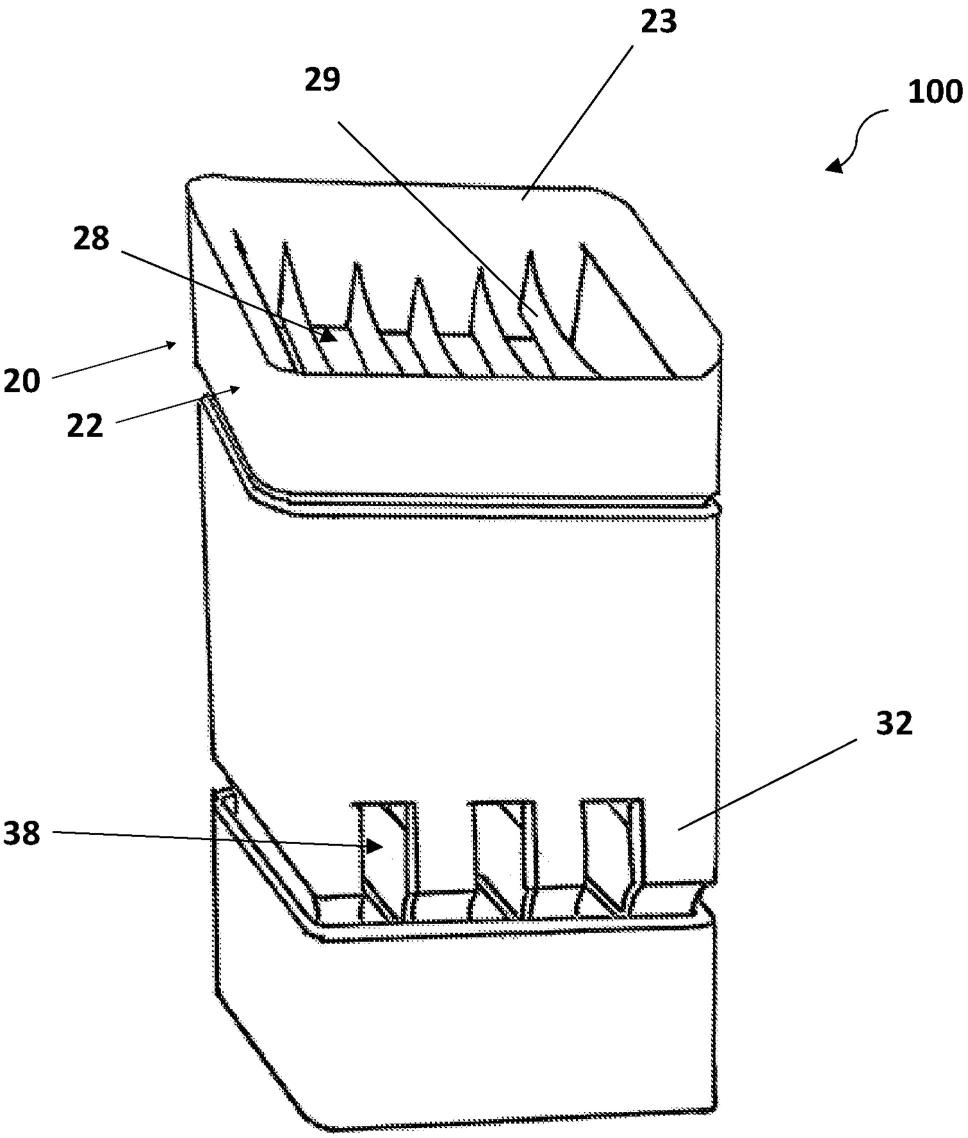
FIG. 9 is a perspective view of a dispenser according to another embodiment of the present disclosure.

FIG. 9 shows an alternative embodiment of the dispenser, with three apertures 38 in the container base 34 and extending into container side walls 32. In this embodiment, the apertures 38 may extend into the container side walls 32 between 10 mm-30 mm to provide increased drainage around the detergent bar within the container and the container base 34.

Figure 3:
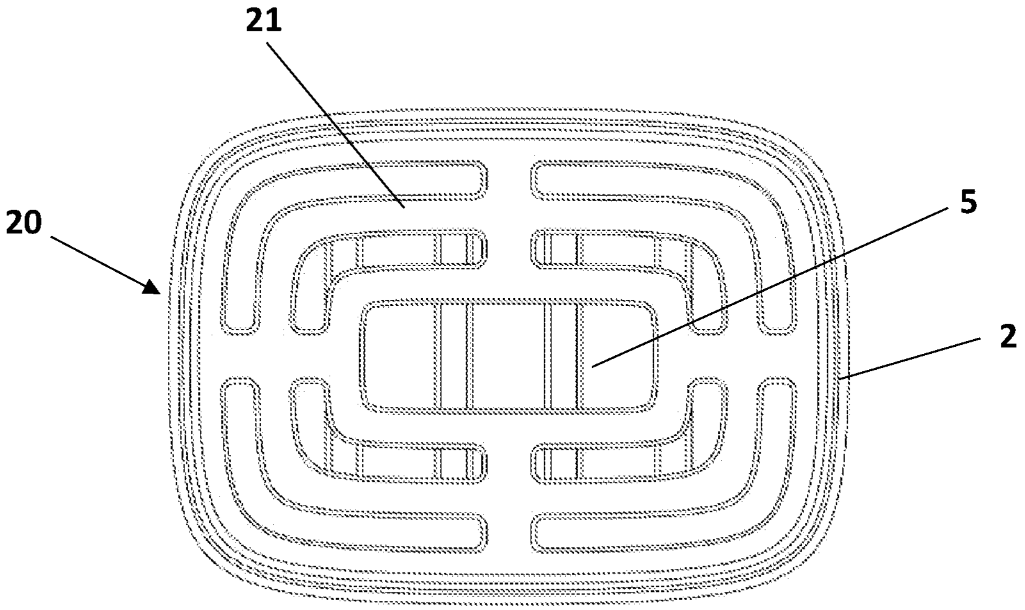
FIG. 3 is a top plan view of the dispenser according to the embodiment of FIG. 1.

Referring again to FIG. 2, the container walls 32 are contemplated as comprising a flange 37 on the container side walls 32 near the open first end 36. This provides a connection point for lid 20 when lid 20 is place over the first end 36 of the container 30, as seen in FIGS. 1-3. The flange 37 is contemplated as an optional feature, as the lid 20 of various embodiments is contemplated as comprising a selectively removable lid that sits directly on or around the container walls, however, the addition of a flange provides a surface to help secure the lid in position on the container. Alternative attachment means and arrangements for the lid and the container are contemplated. For example, in some embodiments, it is contemplated that the lid 20 is threadedly secured to the container 30 wherein the lid comprises a threaded portion and the container comprises an opposing and corresponding threaded portion to secure the two elements. Such threaded connection means are contemplated for use at least with cylindrical-shaped dispensing devices of the present disclosure.

Figure 7:
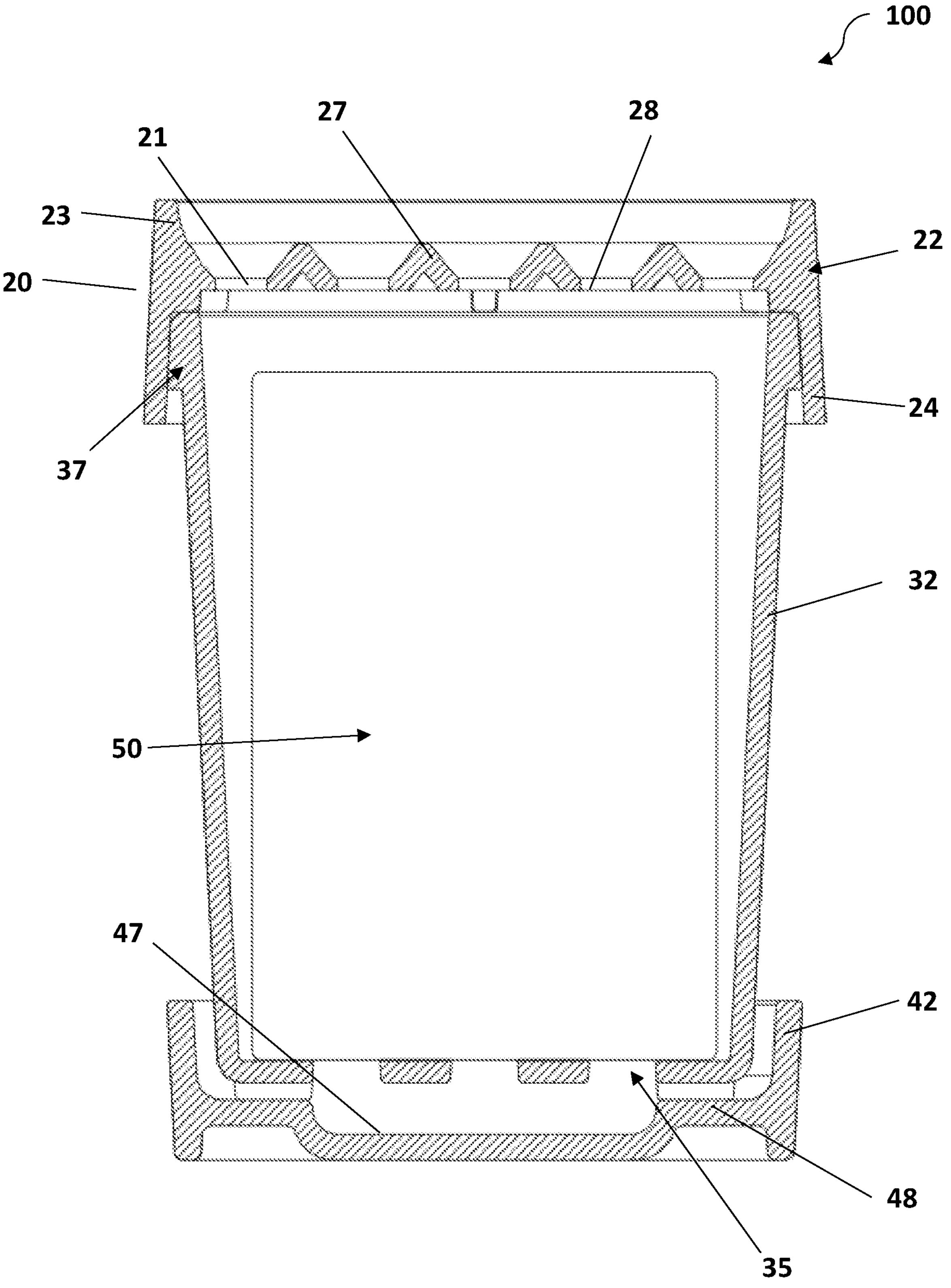
FIG. 7 is a cross-sectional elevation view of a dispenser according to an embodiment of the present disclosure.

FIGS. 1 and 2 show the lid 20 of one embodiment of the present disclosure. A lid 20 of alternate embodiments is shown in FIGS. 7-9. The lid 20 is contemplated as being shaped to be received on to a first end of container 30, securing a detergent bar 50 (or similar) inside the container 30. The lid 20 comprises a lid top 21 surrounded by lid side walls 22. As can be seen most clearly in cross sectional FIG. 7, the lid side walls 22 extend upward from a first upper face of lid top 21 to create a rim 23 around the lid top and extend downward from a second lower face of lid top to form a rim 24 which is adapted to fit around the outside of the container walls 32, and connect with a flange 37 to maintain the lid in a secure position. "Extending upwardly" should be taken to mean extending away from a surface on which the dispenser is resting when standing upright on container base 34 or the base of tray 40, while extending downwardly should be taken to mean extending towards said surface.

In alternative embodiments and as shown in FIG. 9, side walls 22 of the lid 20 extend upwardly from the lid top to create a rim 23, with the lid 20 adapted to engage the container 30 without overhanging side walls 22 (as in FIG. 7). The engagement between the lid 20 and the container 30 may occur using cooperating recesses, channels, threads, rims or similar.

The extension of the rim 23 upwardly from the lid top provides a barrier to direct water flow from a tap or similar through the apertures 25 in the lid top, rather than over the outside of the container, which would both reduce the flow of water through the container and therefore the amount of detergent dispensed, as well as preventing excess splashing over the user.

The side walls 22 may be formed in a variety of heights, however side walls 22 are preferably 5 mm-50 mm in height.

The extension of the rim 23 upwardly from rim top 21 is preferably 10 mm-25 mm, however this is not intended to be limiting. While various preferred embodiments of the present disclosure are contemplated for use with dish and hand washing operations, no limitation with respect to the intended use or application of the dispensing device is provided herewith. Accordingly, no limitation with respect to device size or detergent capacity is provided herewith. In some embodiments, an internal volume of the container comprises a volume of not more than approximately 0.0030 cubic meters.

As shown at least in FIG. 1, the lid 20 comprises one or more apertures 25 extending through lid top 21, allowing water to flow through lid 20 into container 30 when dispenser 100 is held under running water. Apertures 25 may be any shape or size, but preferably cover 20-80% or more preferably, 30-60% of the lid top. In some embodiments, the apertures 25 direct and diffuse a flow of fluid to provide a generally distributed and even flow of fluid across the surface area of the lid 20.

FIGS. 1-3 depict a lid 20 with a central elongate aperture 25 surrounded by a plurality of further elongate apertures spaced apart around the lid top. An alternative example of lid apertures can be seen in FIG. 8 where the lid top 21 is formed with elongate pyramidal ridges 27, with apertures 28 through the lid top formed between each of the ridges.

In the embodiment shown in FIGS. 7 and 8, as fluid flows into the lid 20, the fluid flows down the sides of elongate pyramidal ridges 27 and is directed through apertures 28. The sloping ridges 27 maximise fluid catchment and direct fluid to a narrower aperture 28, reducing splashback of the fluid back up through the lid 20 as the fluid hits the detergent bar 50.

In alternative embodiments, the lid top 21 is formed to include a grate or mesh structure that allows water to flow through lid top 21. In one embodiment and as shown in FIG. 9, the lid top 21 includes a series of parallel fins 29 extending upwardly from a first upper face of the lid top 21, and the fins 29 directing fluid flow towards apertures located in the lid top between one or more fins.

The fins 29 may comprise a range of shapes. For example, a substantially triangular or polygonal cross section is contemplated for the fins and the fins may include one or more curves or curved edges in one or more directions. The fin shape may change or be consistent across the cross-sectional length.

The lid top 21 may alternatively be formed to include a mesh or grate type structure, where a number of cross bars in one or many directions are separated by apertures, or the lid top may be formed with three-dimensional porous scaffolding in some regions. When not being held under running fluid to dispense detergent, the container 30 is contemplated as being provided in a tray 40, which is operable to capture fluid and dissolved detergent from the bar within the container as it dries following use.

Figure 4:
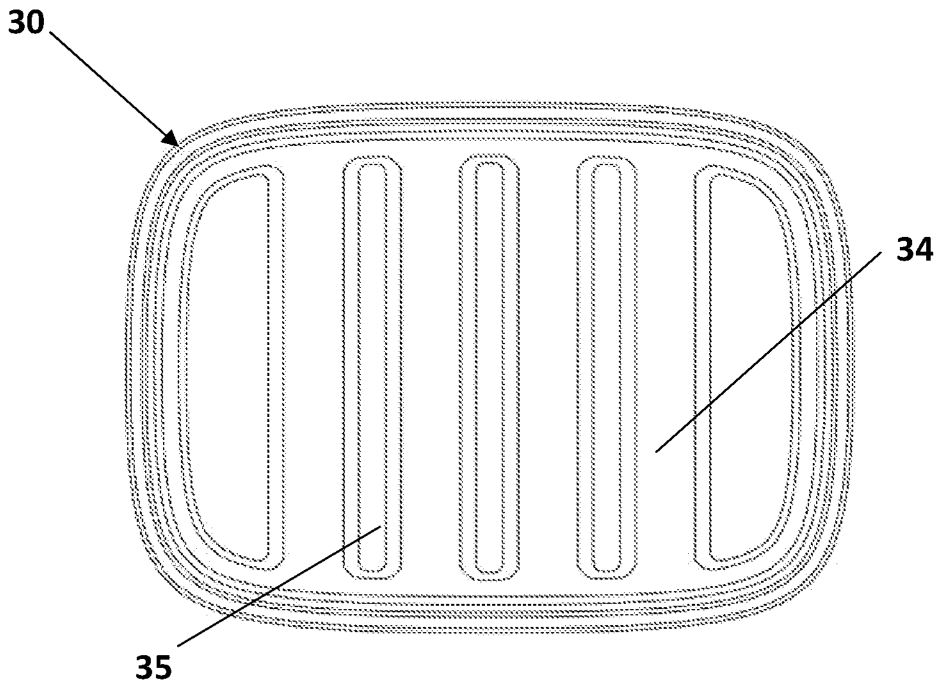
FIG. 4 is a bottom plan view of a container base according to one embodiment of the present disclosure.
Figure 5:
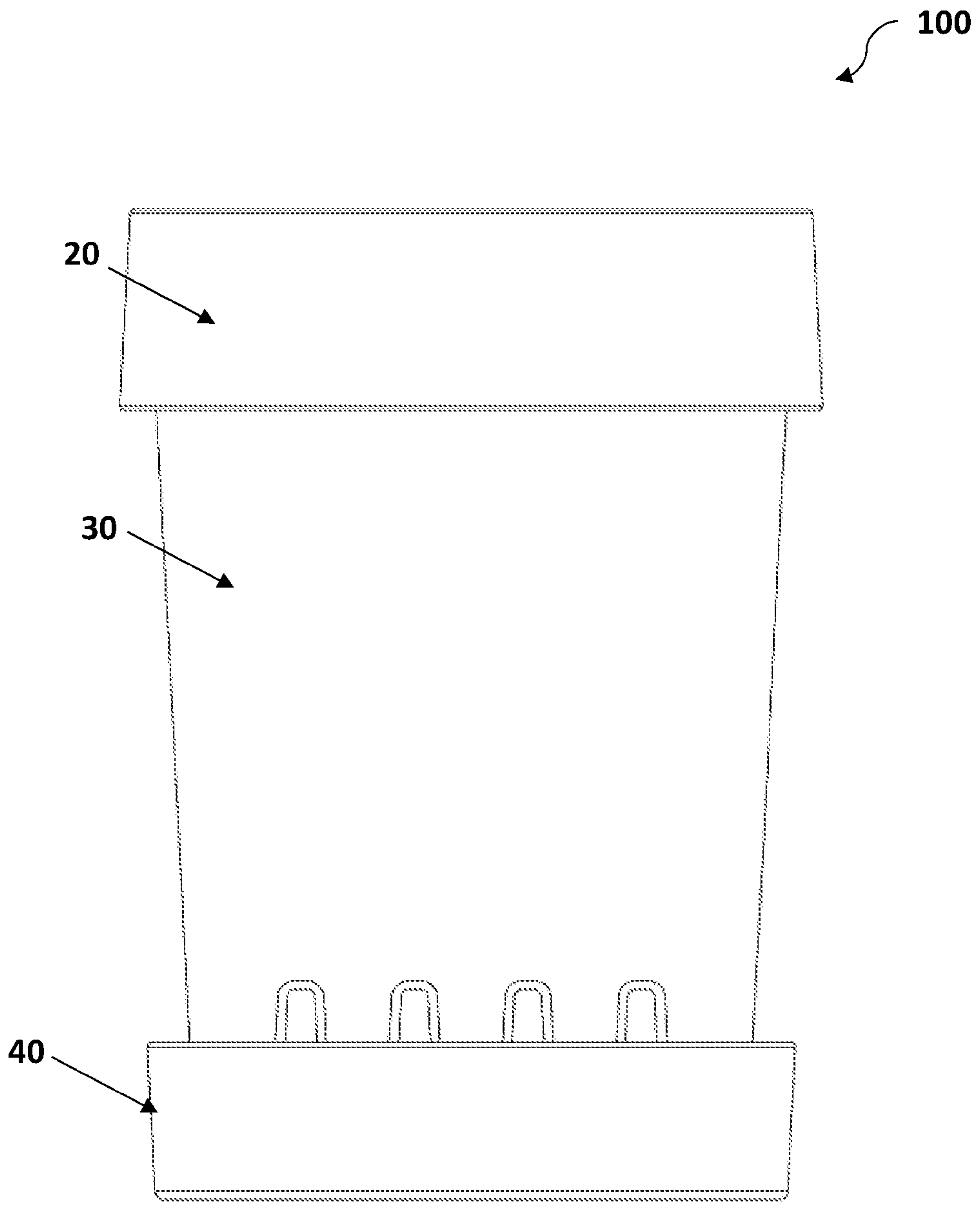
FIG. 5 is a side elevation view of the dispenser according to the embodiment of FIG. 1.
Figure 6:
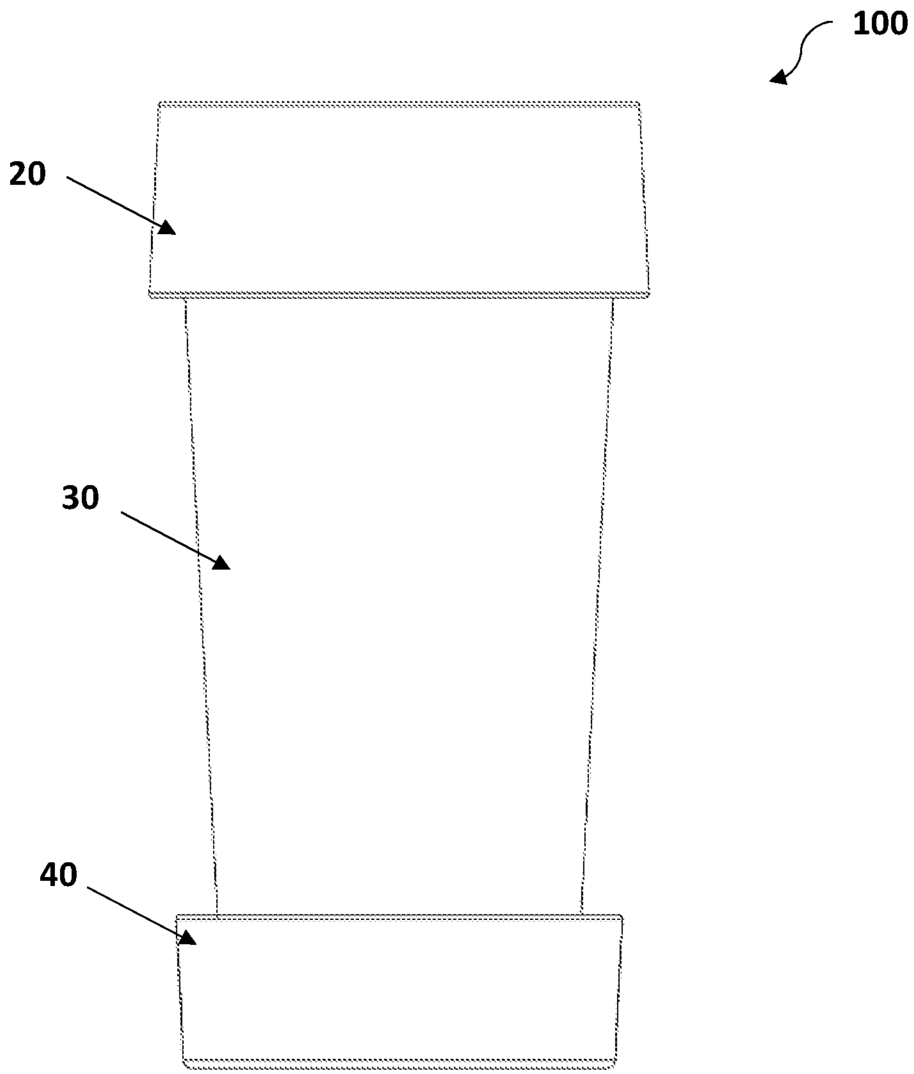
FIG. 6 is front elevation view of the dispenser according to the embodiment of FIG. 1.

As seen most clearly in FIGS. 2, 4 and 7, the tray 40 comprises a tray surface 41 surrounded by tray side walls 42 that preferably extend upward and substantially perpendicular to the tray surface 41, providing a barrier into which container 30 can be placed. The tray surface 41 is a solid surface, but may include a range of ridges, depressions, undulations or raised features to encourage both air flow into the container and drainage from the container, at least when the container is placed on the tray.

As shown in FIGS. 7 and 8, the tray surface 41 is contemplated as comprising a central trough, recess, sump or depression 47 that sits below the tray surface edges 48, allowing the container 30 to rest on surface edges 48, while fluid drains into the depression 47.

In some embodiments, the ridges or raised features on the tray surface are positioned to correspond to the apertures in the container base, such that when the container 30 rests on the tray 40, some or all of the tray ridges and container apertures interlock for added container stability.

FIG. 2 shows a tray 40 including four elongate ridges, such that when the container base includes four elongate apertures, the elongate ridges of the tray surface are received within the elongate apertures of the container base.

As shown in FIGS. 7 and 8, the tray surface 41 may include a central depression 47 that sits below tray surface edges 48, allowing container 30 to rest on surface edges 48, while water drains into depression 47 and enables air flow through the apertures 35 in the container base 34 to dry a detergent bar 50.

In various embodiments of the present disclosure, dispensing devices are provided as an alternative solution to the use of plastics, particularly single-use plastics. While no limitation with respect to dispenser material(s) is provided herewith, it is contemplated dispensers of the present disclosure are preferably made from sustainable materials that are least one of biodegradable, compostable, and recyclable. In some embodiments, containers comprise moulded 100% bamboo fibre. In other embodiments, devices of the present disclosure are formed from a range of known materials and techniques such as polymers, plastics, nylon, recycled/recyclable plastics, aluminium, or various plant based materials such as sugar cane and plant-based plastic(s). The dispenser may be press-moulded, injection moulded, created using additive manufacturing techniques or using other suitable methods as would be recognized by a person skilled in the art.

Detergent bars and detergents contemplated for use with embodiments of the present disclosure preferably comprise a concentrated detergent bar comprising one or more surfactants and a preservative. It will be recognized, however, that inventive aspects of the present disclosure are provided that are irrespective of the detergent, soap or material to be provided within the device(s).

Preferably, the solid detergent bar comprises surfactants selected from lauryl glucoside, decyl glucoside, coco glucoside, sodium cocoyl isethionate, sodium lauryl sulfoacetate, sodium lauryl sulfate, sodium C14-16 alpha olefin sulfonate, sodium coco sulphate, capryl glucoside, sodium cocoamphoacetate and/or cocamidopropyl betaine.

More preferably, the solid detergent bar comprises sodium cocoyl isethionate, lauryl glucoside, decyl glucoside, Geogard 221, citric acid and one or more essential oils. When supplied as a kit together with the dispenser of the present invention, the detergent bar is pressed and shaped such that it is easily received within container 30. To allow for maximum usage of the detergent bar, detergent bar 50 preferably fills 80-95% of container 30 when inserted, but may be sold in a wide range of sizes and shapes to provide the consumer with suitable choice.

Where in the foregoing description reference has been made to integers or components having known equivalents thereof, those integers are herein incorporated as if individually set forth.

It should be noted that various changes and modifications to the presently preferred embodiments described herein will be apparent to those skilled in the art. Such changes and modifications may be made without departing from the spirit and scope of the invention and without diminishing its attendant advantages. It is therefore intended that such changes and modifications be included within the present invention.

Although the foregoing text sets forth a detailed description of numerous different embodiments, it should be understood that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims. To the extent that any term recited in the claims at the end of this patent is referred to in this patent in a manner consistent with a single meaning, that is done for sake of clarity so as to not confuse the reader, and it is not intended that such claim term by limited, by implication or otherwise, to that single meaning.

While various embodiments of the present inventions have been described in detail, it is apparent that modifications and alterations of those embodiments will occur to those skilled in the art. Moreover, references made herein to "the present invention" or aspects thereof should be understood to mean certain embodiments of the present invention and should not necessarily be construed as limiting all embodiments to a particular description. It is to be expressly understood that such modifications and alterations are within the scope and spirit of the present invention.

What is claimed is:

1. A storage and dispensing device comprising:

a container operable to receive a solid detergent bar, the container comprising side walls and a base operable to support the solid detergent bar;

a first upper end provided at an opposing end of the side walls from the container base;

wherein the first upper end comprises at least one opening, and the container base comprises at least one aperture extending through the container base, and wherein at least a portion of the at least one opening of the first upper end is aligned with the at least one aperture of the container base such that a fluid is able to flow through the first upper end under the force of gravity, through the container and exit the at least one aperture of the container base;

a lid top operable to communicate with the first upper end and comprising a first face and an opposing second face;

wherein the first face includes one or more fins extending from the first face of the lid top; and a tray operable to receive the base of the container, the tray comprising a first face and an opposing second face, wherein the base of the container is operable to be received on the first face.

2. The storage and dispensing device of claim 1, wherein the lid top includes a central elongate aperture and a plurality of additional elongate apertures surrounding the central elongate aperture.

3. The storage and dispensing device of claim 1, wherein at least one lid side wall extends upwardly from the first face around a circumference of the lid top.

4. The storage and dispensing device of claim 3, wherein the at least one lid side walls defines a recess for receiving the container side walls.

5. The storage and dispensing device of claim 1, wherein the base of the container comprises a plurality of apertures operable to allow the fluid to flow out of the device.

6. A storage and dispensing device comprising:

a container operable to receive a solid detergent bar, the container comprising an upper end, a lower end and side walls extending therebetween;

wherein the side walls have an internal surface and an external surface and the internal surface of the container is operable to support the solid detergent bar;

the upper end of the device comprising at least one aperture operable to allow a fluid to flow through the container and contact the solid detergent bar;

the lower end comprising a plurality of apertures to allow the fluid to flow therethrough and exit the device;

wherein the at least one aperture of the upper end of the device is disposed vertically above the lower end, and a solid detergent bar is operable to be disposed therebetween; and at least one of a sump and a depression to allow the fluid to drain from the container and facilitate drying and storage of the solid detergent bar.

7. The storage and dispensing device of claim 6, wherein at least one of the selectively removable lid and the container comprises a resilient projection to selectively secure the lid to the container.

8. A method of preparing a cleaning agent, the method comprising:

providing a container operable to receive a solid detergent bar, the container comprising an upper end, a lower end and side walls extending therebetween; wherein the side walls have an internal surface and an external surface; the upper end of the container comprising a selectively removable lid comprising a plurality of aperatures to allow a fluid to flow through the container and contact the solid detergent bar; the lower end comprising at least one aperture to allow the fluid to flow therethrough and exit the device; wherein at least one aperture of the plurality of aperatures of the selectively removable lid is disposed vertically above and aligned with the lower end of the container; and providing the solid detergent bar within the container and wherein the solid detergent bar is provided between the at least one aperture of the upper end of the device and the lower end of the container;

providing a flow of the fluid to the container and allowing the fluid to enter the container and contact the solid detergent bar;

allowing the fluid to egress the container under the force of gravity; and recapturing or using the fluid and detergent solution in one or more cleaning operations.

9. The method of claim 8, further comprising a tray operable to receive the container and wherein the container is provided to the tray after the fluid is allowed to egress the container.

10. The method of claim 9, wherein the tray comprises at least one of a trough, a sump and a recess to collect fluid.

11. The method of claim 8, wherein the container comprises an internal volume for receiving the solid detergent bar and the internal volume comprises a volume of not more than approximately 0.0030 cubic meters.

12. The method of claim 8, wherein the container comprises a material that is at least one of biodegradable and compostable.

* * * * *